United States Patent Office 2,878,279
Patented Mar. 17, 1959

2,878,279

PROCESS OF MAKING BIS-CARBAMIC ACID ESTER COMPOUNDS

Otto Schmid, Leonding, near Linz, and Ludwig Bilek and Walter Seifried, Linz, Austria, assignors to Oesterreichische Stickstoffwerke Aktiengesellschaft, Linz (Donau), Austria, a corporation of Austria No Drawing. Application June 16, 1954
Serial No. 437,272

Claims priority, application Austria June 23, 1953

4 Claims. (Cl. 260—482)

The present invention relates to new carbamic acid ester compounds and more particularly to new and valuable polymethylene and phenylene bis-carbamic acid ester compounds, especially their quaternary ammonium compounds, and to a process of making same.

It is one object of the present invention to provide a simple and improved process of making such quaternary ammonium compounds of polymethylene bis-carbamic acid esters.

Other objects of the present invention and advantageous features thereof will become apparent as the description proceeds.

The quaternary ammonium compounds according to the present invention correspond in principle to the following formula:

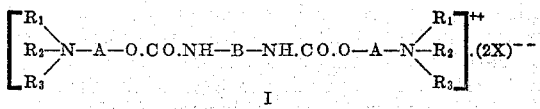

In said formula $R_1$, $R_2$, $R_3$ represent methyl radicals while A is the ethylene radical and B is a polymethylene radical with more than two methylene groups and X is an anionic radical.

The process of producing such compounds according to the present invention consists in condensing the corresponding di-isocyanates of the polymethylene series or compounds which are convertible into such di-isocyanates, with 2-amino alcohols having a tertiary amino group. Thereby the corresponding di-tertiary bases of the formula

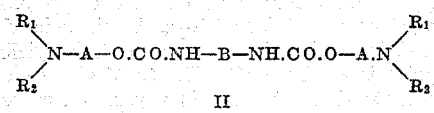

are obtained which are then subjected to quaternization at the two tertiary nitrogen atoms.

Organic isocyanates as they are used as starting materials according to the present invention correspond to the following formula:

$$O=C=N.(CH_2)_y.N=C=O$$
III wherein y is an integer higher than 2. Compounds which are convertible into such di-isocyanates are, for instance, polymethylene dicarboxylic acid diazides of the formula $$N_3.OC.(CH_2)_y.CO.N_3$$
IV or polymethylene dicarbamic acid dichlorides of the formula $$Cl.OC.NH.(CH_2)_y.NH.CO.Cl$$
V The tertiary 2-amino alcohols useful in this reaction correspond to the following formula:

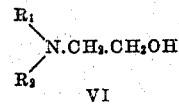

The resulting bases correspond to the following formula:

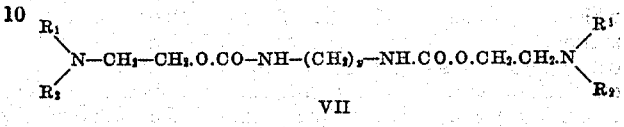

The tertiary amino alcohol used in this synthesis of di-tertiary bases (Formula VII) is dimethylamino ethanol.

Quaternization of said di-tertiary bases of Formula VII is carried out according to the present invention with alkylating agents of the formula $R_3X$. Said alkylating agents are, for instance, methyl halogenides, dimethyl sulfate, toluene sulfonic acid esters and the like. Thereby the quaternary ammonium compounds illustrated by Formula I are obtained.

The compounds obtained according to the present invention are valuable pharmaceutical agents and can also be used for pest control. Several of said compounds possess a considerable pharmacological effect of inhibiting the true cholinesterases as well as the pseudo-cholinesterases. The polymethylene bis-(carbamic acid choline esters) have a high neuromuscular-blocking effect. Hexamethylene bis-(carbamic acid choline ester), the preparation of which in the form of various crystalline pure salts is described hereinafter in Examples 4, 5, 6, and 7, belongs to the most highly and most persistently active synthetic muscle relaxant heretofore known.

The following examples serve to illustrate the present invention without, however, limiting the same thereto. The amounts given in said examples are expressed in parts by weight.

EXAMPLE 1

*Tetramethylene bis-(carbamic acid-β-dimethylamino ethyl ester)*

9.5 parts of tetramethylene di-isocyanate are mixed, while cooling, with 14.6 parts of β-dimethylamino ethanol. The reaction mixture is allowed to stand at room temperature for 24 hours. The resulting crystalline mass is dissolved in 36 parts of acetone. Any undissolved flakes are filtered off and petroleum ether (of low boiling point) is added to the clear solution at 0° C. while cooling. Thereby a crystalline mass precipitates. Said mass is filtered off by suction and the crystals are washed with a cold mixture of acetone and petroleum ether (1:5). 19.6 parts of tetramethylene bis-(carbamic acid-β-dimethylamino ethyl ester) are obtained in the form of white crystalline leaflets. The yield amounts to 91% of the theoretical yield. The melting point of this product is at 58° C.

*Tetramethylene bis-(carbamic acid choline iodide ester)*

5 parts of tetramethylene bis-(carbamic acid-β-dimethylamino ethyl ester) are dissolved in 8 parts of acetone. 10 parts of methyl iodide are added in portions to said solution while cooling. The precipitated oil soon crystallizes. The crystals are filtered off by suction and are recrystallized from 120 parts of 96% ethanol. Thereby 9.3 parts of said tetramethylene bis-(carbamic acid choline iodide ester) are obtained in the form of white crystals melting at 190–193° C. The yield amounts to 98% of the theoretical yield.

EXAMPLE 2

*Octamethylene bis-(carbamic acid-β-dimethylamino ethyl ester)*

20.7 parts of β-dimethylamino ethanol are added to and mixed with 15.2 parts of octamethylene di-isocyanate while stirring and cooling. The mixture is allowed to stand at room temperature for 24 hours. The resulting crystallized reaction product is dissolved, while heating moderately, in 50 parts of acetone. 200 parts of water are added to said solution and the mixture is allowed to cool. A small amount of slimey flakes are removed by filtration and the acetone is distilled off by vacuum distillation from the clear filtrate. On cooling, white silky leaflets precipitate. They are filtered off by suction, washed with ice water, and dried. The yield of octamethylene bis-(carbamic acid-β-dimethylamino ethyl ester) amounts to 24 parts corresponding to 83% of the theoretical yield. The melting point of the resulting product is at 78° C. The above mentioned compound can be obtained with about the same yield by dissolving sebacic acid diazide in chloroform, heating said solution with dimethylamino ethanol, removing the chloroform, and working up the resulting reaction product as described hereinbefore.

*Octamethylene bis-(carbamic acid choline chloride ester)*

4.5 parts of octamethylene bis-(carbamic acid-β-dimethylamino ethyl ester), obtained as described hereinbefore, are dissolved in 32 parts of acetone. 20 parts of methyl chloride are added in three portions to said solution while cooling. The mixture is allowed to stand at 0° C. for 10 days. Excess of methyl chloride and the acetone are separated from the precipitated white crystalline mass. The crystals are reprecipitated from alcohol-ether (1:11). The resulting crystals are filtered off by suction, washed with ether, and dried. In this manner 5.2 parts of a white crystal powder having a melting point of 205–208° C. are obtained. The yield corresponds to 91% of the theoretical yield.

EXAMPLE 3

*Decamethylene bis-(carbamic acid-β-dimethylamino ethyl ester)*

7.9 parts of decamethylene di-isocyanate are mixed with 7.9 parts of dimethylamino ethanol while cooling. The reaction product soon crystallizes and is allowed to stand at room temperature for two days. The crystals are then dissolved in 40 parts of warm acetone. After cooling, a small amount of precipitated flakes is removed by filtration. 300 parts of petroleum ether (of low boiling point) are added to the clear filtrate and the decamethylene bis-(carbamic acid-β-dimethylamino ethyl ester) is precipitated thereby. The precipitate is filtered off by suction, washed, and dried, and yields about 7.9 parts of said product of a melting point of 77–79° C. 3.6 parts of the same compound can be recovered from the mother liquor. The total yield amounts to 11.5 parts corresponding to 81% of the theoretical yield.

*Decamethylene bis-(carbamic acid choline iodide ester)*

7.9 parts of decamethylene bis-(carbamic acid-β-dimethylamino ethyl ester) are dissolved in 40 parts of acetone. 15 parts of methyl iodide are slowly added to said solution while cooling and stirring. Thereby an oil precipitates which immediately starts to crystallize. The mixture is allowed to stand for two days. The crystals are then filtered off by suction, washed, and dried. The crude product obtained in this manner in an amount of 13.5 parts is recrystallized from absolute alcohol. Thereby 12.9 parts of decamethylene bis-(carbamic acid choline iodide ester) are obtained in the form of analytical grade white crystals melting at 135–136.5° C. The yield amounts to 96% of the theoretical yield.

EXAMPLE 4

*Hexamethylene bis-(carbamic acid-β-dimethylamino ethyl ester)*

16.2 parts of hexamethylene di-isocyanate are reacted, while cooling, with 20.4 parts of dimethylamino ethanol. The reaction mixture is allowed to stand at room temperature for 24 hours. The resulting solid reaction product is dissolved in methyl ethyl ketone or acetone, a small amount of undissolved solid byproduct is filtered off, and hexamethylene bis-(carbamic acid-β-dimethylamino ethyl ester) is precipitated in the form of well shaped crystals by the addition of petroleum ether to the filtrate. The melting point of the product is 68–70° C. The yield is 27.3 parts corresponding to 82% of the theoretical yield.

*Hexamethylene bis-(carbamic acid choline chloride ester)*

5 parts of hexamethylene bis-(carbamic acid-β-dimethylamino ethyl ester) obtained as described above, are dissolved in 15 parts of methyl ethyl ketone. 6 parts of methyl chloride are added to said solution. The reaction mixture is allowed to stand for several days. Hexamethylene bis(carbamic acid choline chloride ester) precipitates first in the form of an oil which gradually crystallizes. The crystalline product, on reprecipitation from methanol-acetone has a melting point of 187° C.

EXAMPLE 5

*Hexamethylene bis-(carbamic acid choline bromide ester)*

42 parts of hexamethylene bis-(carbamic acid-β-dimethylamino ethyl ester) obtained according to Example 4, are dissolved in 350 parts of acetone. 100 parts of methyl bromide are added to said solution. The reaction mixture is allowed to stand for 24 hours whereby the reaction product precipitates almost quantitatively. The precipitate is recrystallized from ethanol or from a mixture of methanol and acetone. 56.5 parts of hexamethylene bis-(carbamic acid choline bromide ester) are obtained thereby, corresponding to 87% of the theoretical yield. Said compound has a melting point of 174–176° C.

EXAMPLE 6

*Hexamethylene bis-(carbamic acid choline iodide ester)*

10 parts of hexamethylene bis-(carbamic acid-β-dimethylamino ethyl ester) obtained according to Example 4, are dissolved in 200 parts of methyl ethyl ketone. 35 parts of methyl iodide are admixed thereto. The reaction mixture is allowed to stand for 12 hours at room temperature. A crystalline mass precipitates thereby which mass is recrystallized from a mixture of ethanol and water, for instance, from 96% ethanol whereby the dihydrate of hexamethylene bis-(carbamic acid choline iodide ester) is obtained in almost quantitative yield. Its melting point is at about 118° C. On drying said compound at elevated temperature in a vacuum, it loses its water of crystallization and melts, in the anhydrous state, at 173° C.

EXAMPLE 7

*Hexamethylene bis-(carbamic acid-β-dimethylamino ethyl ester-p-toluene sulfonic acid methylate)*

5 parts of hexamethylene bis-(carbamic acid-β-dimethylamino ethyl ester) obtained according to Example 4, and 5.6 parts of p-toluene sulfonic acid methyl ester are dissolved in 25 parts of acetone. The reaction mixture is allowed to stand at room temperature for 48 hours. The precipitated crystals are filtered off by suction, washed with acetone, and dried. 10 parts of hexamethylene bis-(carbamic acid-β-dimethylamino ethyl ester-p-toluene sulfonic acid methylate) corresponding to 96% of the theoretical yield are obtained thereby. On recrystallization from methanol and drying at 110° C. in a vacuum, the analytical grade compound has a melting point of 257–261° C.

Other quaternary ammonium compounds corresponding to Formula I given hereinbefore are obtained in an analogous manner as disclosed in the preceding examples. For instance, when proceeding according to the above given example, there can be used in place of tetramethylene di-isocyanate equimolecular amounts of other polymethylene di-isocyanates having up to 10 methylene groups in their molecule.

In place of methyl halogenides there can be used for quaternization reaction dimethylsulfate, sulfonic acid esters, such as p-toluene sulfonic acid esters, and other quaternizing compounds.

The quaternary ammonium compounds which are obtained by the process according to the present invention, as described in the preceding examples, have interesting pharmacological properties and are successfully employed in therapy as highly effective muscle relaxants. Especially valuable are the polymethylen bis-(carbamic acid choline ester) compounds of the following formula

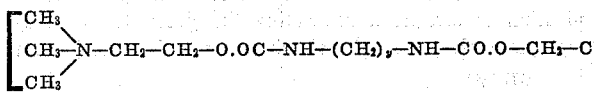

wherein Y is an integer higher than 2 and X is an anionic radical and especially halogen. As stated above, compounds of this type have a surprisingly high neuromuscular activity.

Maximum neuromuscular paralyzing effect is obtained with hexamethylene bis-(carbamic acid choline halogenide ester) and octamethylene bis-(carbamic acid choline halogenide ester). Said compounds proved to be about three times as effective as the known and widely used decamethonium halogenide on comparing said drugs in tests with non-narcotized dogs and narcotized cats. These new compounds have the further advantage that, on administration of larger doses, their neuromuscular paralyzing effect is considerably prolonged.

Another very important advantage of said compounds is that they do not exhibit any ganglionic stimulating effect and more particularly do not cause an increase in blood pressure when applied in doses required for their neuromuscular paralyzing action. It is, however, an essential characteristic of the present invention, that the compounds used in therapy must be of highest purity and must be present in the crystalline state. An amorphous non-crystalline product is not suitable for therapeutic purposes apparently due to accompanying by-products. Such an amorphous product produces, on administration to patients, nicotine-like side-effects and more particularly increase in blood pressure, accelerated respiration and frequently arhythmias which are very objectionable.

Clinical tests have been carried out, for instance, with hexamethylene bis-(carbamic acid choline bromide ester) of Example 5. This drug was used as curare substitute and makes it possible to obtain great muscle relaxation without using high dosage of general anesthetics. It was administered by means of intravenous injection together with the anesthetic, such as thiopental sodium known to the trade as "Pentothal Sodium" or similar anesthetics. It is noteworthy and a distinct advantage of the muscle relaxant according to the present invention that both solutions, the barbiturate solution and the hexamethylene bis-(carbamic acid choline bromide ester) solution, can readily be mixed with each other without any precipitation of the barbiturate. Such precipitation occurs with a number of other heretofore used muscle relaxants.

The initial dose of hexamethylene bis-(carbamic acid choline bromide ester) is adjusted, on the one hand, in accordance with the body weight of the patient and, on the other hand, according to the expected duration of the operation.

Clinical experience has shown that the following initial dose yields satisfactory results:

For operations presumably lasting half an hour to one hour, 0.05 mg. to 0.07 mg. of hexamethylene bis-(carbamic acid choline bromide ester) are administered per kg. of body weight.

For operations presumably exceeding a duration of one hour, 0.08 mg. to 0.10 mg. per kg. of body weight are required.

In most cases one single administration of such a dose is sufficient to carry out the operation without any appreciable disturbance. Except in the case of extensive operations of long duration it is advisable not to increase the dose above 0.10 mg. per kg. of body weight.

The new compounds are usually provided in the form of isotonic aqueous solutions of their water soluble salts containing between about 1 mg. and about 100 mg. per cc.

The compounds obtained according to the present invention may also be orally administered, for instance, in the form of tablets, pills, lozenges, dragées, and the like preparations. They may furthermore be employed in therapy in the form of powders filled in gelatine capsules and the like. Such preparations are preferably diluted with a suitable carrier and extending agent.

For instance, when preparing tablets, pills, dragées and the like, the commonly used diluting agents, binders, and the like are employed, such as sugar, lactose, talcum, starch, bolus alba, pectin, and as binders, gelatin, gum arabic, methyl cellulose, yeast extract, agar, tragacanth, and others.

We claim:

1. In a process of producing a polymethylene bis-(carbamic acid choline ester) compound of the formula

wherein n is an integer from 4 to 10 and X is an anionic group selected from the group consisting of chlorine, bromine, iodine, and the p-toluene sulfonic acid anion, the steps comprising mixing β-dimethylamino ethanol with a polymethylene diisocyanate having 4 to 10 methylene groups, while cooling, allowing the reaction mixture to stand at room temperature until condensation is complete, dissolving the resulting polymethylene bis-(carbamic acid-β-dimethylamino ethyl ester) in an organic solvent, adding a quaternizing agent with a quaternizing methyl radical to the resulting solution, allowing the reaction mixture to stand until quaternization is complete, separating the resulting precipitated polymethylene bis-(carbamic acid choline ester) compound of the above given formula, and recrystallizing said compound.

2. In a process of producing a hexamethylene bis-(carbamic acid choline ester compound) of the formula

wherein X is an anionic group selected from the group consisting of chlorine, bromine, iodine, and the p-toluene sulfonic acid anion, the steps comprising admixing β-dimethylamino ethanol, while cooling, to hexamethylene diisocyanate, allowing the reaction mixture to stand at room temperature until condensation is complete, dissolving the reaction product in a water soluble lower aliphatic ketone, filtering off undissolved impurities, precipitating the resulting hexamethylene bis-(carbamic acid-β-dimethylamino ethyl ester) from said solution by the addition of petroleum ether, separating the precipitated ditertiary base from said solvents, dissolving said base in a water soluble lower aliphatic ketone, adding to said solution a quaternizing agent with a quaternizing methyl radical, allowing the reaction mixture to stand until quaternization is complete, separating the precipitated hexamethylene bis-(carbamic acid choline ester compound) from the solvent, and recrystallizing said quaternary compound from a water soluble organic solvent.

3. In a process of producing hexamethylene bis-(carbamic acid choline chloride ester) of the formula

the steps comprising admixing β-dimethylamino ethanol, while cooling, to hexamethylene diisocyanate, allowing the reaction mixture to stand at room temperature until condensation is complete, dissolving the reaction product in a water soluble lower aliphatic ketone, filtering off undissolved impurities, precipitating the resulting hexamethylene bis-(carbamic acid-β-dimethylamino ethyl ester) from said solution by the addition of petroleum ether, separating the precipitated ditertiary base from said solvents, dissolving said base in a water soluble lower aliphatic ketone, adding methyl chloride to said solution, allowing the reaction mixture to stand until quaternization is complete, separating the precipitated hexamethylene bis-(carbamic acid choline chloride ester) from the solvent, and recrystallizing said quaternary compound from a water soluble organic solvent.

4. In a process of producing hexamethylene bis-(carbamic acid choline bromide ester) of the formula

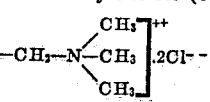

the steps comprising admixing β-dimethylamino ethanol, while cooling, to hexamethylene diisocyanate, allowing the reaction mixture to stand at room temperature until condensation is complete, dissolving the reaction product in a water soluble lower aliphatic ketone, filtering off undissolved impurities, precipitating the resulting hexamethylene bis-(carbamic acid-β-dimethylamino ethyl ester) from said solution by the addition of petroleum ether, separating the precipitated ditertiary base from said solvents, dissolving said base in a water soluble lower aliphatic ketone, adding methyl bromide to said solution, allowing the reaction mixture to stand until quaternization is complete, separating the precipitated hexamethylene bis-(carbamic acid choline bromide ester) from the solvent, and recrystallizing said quaternary compound from a water soluble organic solvent.

References Cited in the file of this patent
UNITED STATES PATENTS

| | | |
|---|---|---|
| 2,585,826 | Olsen | Feb. 12, 1952 |
| 2,683,167 | Girod et al. | July 6, 1954 |
| 2,703,810 | Viard | Mar. 8, 1955 |

OTHER REFERENCES

Iwakura: Chem. Abstracts 44 (1950), 11106 f.
Delaby et al.: Comp. Rend., v. 235 (1952), 376–7.
Cheymol et al.: Comp. Rend., v. 235 (1952), 1711–13.